United States Patent
Rotzinger

(10) Patent No.: US 10,715,617 B2
(45) Date of Patent: Jul. 14, 2020

(54) STREAM RESERVATION CLASS CONVERTER

(71) Applicant: Harman Becker Automotive Systems GmbH, Karlsbad (DE)

(72) Inventor: Jens Rotzinger, Straubenhardt (DE)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 70 days.

(21) Appl. No.: 15/639,560

(22) Filed: Jun. 30, 2017

(65) Prior Publication Data

US 2018/0007157 A1  Jan. 4, 2018

(30) Foreign Application Priority Data

Jul. 1, 2016  (EP) ..................................... 16177513

(51) Int. Cl.
*H04L 29/08* (2006.01)
*H04L 29/06* (2006.01)
*H04L 12/40* (2006.01)
*H04L 12/841* (2013.01)
*H04L 12/851* (2013.01)

(52) U.S. Cl.
CPC .... *H04L 67/2823* (2013.01); *H04L 12/40013* (2013.01); *H04L 69/08* (2013.01); *H04L 47/24* (2013.01); *H04L 47/28* (2013.01); *H04L 65/4069* (2013.01); *H04L 67/12* (2013.01); *H04L 2012/40273* (2013.01)

(58) Field of Classification Search
CPC ...................................................... H04L 69/08
See application file for complete search history.

(56) References Cited

U.S. PATENT DOCUMENTS

| | | | |
|---|---|---|---|
| 7,324,491 B1* | 1/2008 | Benveniste | H04L 12/66 370/338 |
| 8,873,392 B1* | 10/2014 | Orr | H04L 47/2458 370/235 |
| 2012/0076036 A1 | 3/2012 | Teener | |
| 2013/0138800 A1* | 5/2013 | Gelter | H04L 12/1881 709/224 |
| 2014/0293791 A1 | 10/2014 | Rabie et al. | |

FOREIGN PATENT DOCUMENTS

| | | |
|---|---|---|
| EP | 2996350 A1 | 3/2016 |
| WO | 2006108281 A1 | 10/2006 |

OTHER PUBLICATIONS

"IEEE Standard for Layer 2 Transport Protocol for Time-Sensitive Applications in Bridged Local Area Networks," IEEE Standard P1722a_D8, Apr. 2, 2014, 218 pages.
European Patent Office, Extended European Search Report Issued in Application No. 16177513.5, dated Dec. 20, 2016, Germany, 10 pages.
European Patent Office, Office Action Issued in Application No. 16177513.5, dated Feb. 26, 2019, Netherlands, 9 pages.

* cited by examiner

*Primary Examiner* — Hoon J Chung
(74) *Attorney, Agent, or Firm* — McCoy Russell LLP

(57) ABSTRACT

There is provided a network device for processing data packets transmitted between nodes of a network, the network device to intercept data packets of a first traffic class transmitted by a first network node and addressed to a second network node, convert the intercepted data packets into data packets of a second traffic class, and transmit the converted data packets to the second network node.

18 Claims, 2 Drawing Sheets

STREAM RESERVATION CLASS CONVERTER

CROSS REFERENCE TO RELATED APPLICATIONS

The present application claims priority to European Patent Application No. EP 16177513, entitled "STREAM RESERVATION CLASS CONVERTER," and filed on Jul. 1, 2016, the entire contents of which are hereby incorporated by reference for all purposes.

TECHNICAL FIELD

The present invention relates to a network device for processing data packets transmitted between nodes of a network, in particular in an Ethernet Audio Video Bridging (AVB) network or a Time Sensitive Network (TSN).

BACKGROUND

Audio Video Bridging (AVB) is a networking protocol pertaining to streaming audio and/or video data via a network (e.g., an Ethernet network), described in IEEE 802.1 standards. An AVB network may include one or more talkers (e.g., transmitter nodes) and one or more listeners (e.g., receiver nodes) for transmitting and receiving audio/video data according to the Audio/video transport protocol (AVTP), described in the IEEE 1722 standard.

Similarly, Time-Sensitive Networking (TSN) is a set of IEEE 802 Ethernet sub-standards. These standards enable deterministic real-time communication over Ethernet. Time-Sensitive Networking ensures a bounded maximum latency for scheduled traffic through switched networks. Possible applications include converged networks with real time Audio/Video Streaming and real-time control streams which are used in automotive or industrial control facilities.

When audio/video data is transmitted from a talker to a listener, the data may pass through hops (e.g., bridges or switches) located in the network. For example, the network may comprise bridges that receive the data, determine a next location (e.g., a next bridge), and send the data to the next location toward the listener. The time the data takes to be transmitted from the talker to the listener, including the time taken for the bridge(s) to perform these actions, constitutes a latency.

One of the features of AVB and TSN networks is the definition of Quality of Service (QoS) requirements and associated traffic or Stream Reservation (SR) classes. Each traffic class defines a maximum latency based on the presence of a maximum number of seven hops between the talker and the listener in the network. The latency includes the accumulated time it takes for the data to transit through the switches (accumulated transit time). The maximum latency may include the accumulated transit time plus a predetermined margin.

For example, AVB traffic class A is the highest class and defines a maximum latency of 2 ms over seven hops. Traffic class A is particularly suited for the transmission of low latency audio data. Traffic class B defines a maximum latency of 50 ms over seven hops and can be used for the transmission of video data. Additional, lower traffic classes include so-called traffic class 64Sample 48 kHz (Class 64×48 k) and traffic class 64Sample 44.1 kHz (Class 64×44.1 k). These classes can define even lower maximum latencies.

Examples of traffic classes in the context of AVB are described in Automotive Ethernet AVB Functional and Interoperability Specification Revision 1.4.

Generally, relative to the other classes, the transmission of data of a higher traffic class (e.g. AVB traffic class A) causes a relatively higher processing (e.g., interrupt) load on the listener node. However, in some networks, not all listener nodes have the performance required to process such high class traffic.

The present invention aims to address this problem.

SUMMARY

According to one aspect of the present invention, there is provided a network device for processing data packets transmitted between nodes of a network, the network device to intercept data packets of a first traffic class transmitted by a first network node and addressed to a second network node, convert the intercepted data packets into data packets of a second traffic class, and transmit the converted data packets to the second network node.

The network device of the present invention enables network nodes, in particular a listener designed for a certain traffic class to receive and process data packets having a different traffic class.

Thus, the present provides interoperability between two network nodes or devices implemented for different traffic classes. The interoperability may be considered achieved if the lower traffic class node satisfies criteria normally associated with the higher traffic class node only, e.g. satisfying a predetermined latency threshold. However, the interoperability may also be achieved if other criteria are satisfied, for example reduced latency so that a user does not perceive any delay in the replay of an audio and/or video signal.

In one embodiment, the network is an Audio Video Bridging (AVB) network, wherein the first and second traffic classes are Stream Reservation (SR) classes, and in particular wherein the first traffic class is AVB class A and the second traffic class is a relatively lower AVB traffic class. As described above, AVB networks support different QoS requirements associated with respective SR classes. The present embodiment enables an integration of talker and listener nodes having different QoS requirements and SR classes in a single network without having to modify the talker and/or listener nodes.

In another embodiment, the network is a Time Sensitive Networking (TSN) network. However, the present invention is not limited to AVB or TSN networks. Rather, the present invention can be implemented in other Ethernet or wireless networks comprising nodes of different traffic classes, in particular different latency and/or QoS requirements. The present invention provides interoperability between such nodes.

In an embodiment, the second traffic class is lower than the first traffic class. In particular, the second traffic class may have a lower QoS and/or latency requirement. Thus, it is possible to add talker nodes or services to an existing network that require a high traffic class while retaining nodes that only support a relatively lower traffic class. This approach allows the use of legacy devices, for example older backward compatible listener devices.

In an exemplary embodiment, the network device is a bridge device. In this embodiment, existing networks may easily be modified to include such bridge device.

According to another aspect of the present invention, there is provided a network for streaming audio and/or video data, the network comprising: a first network node for generating and transmitting data packets of a first traffic class; a second network node for receiving data packets of a second traffic class; and a network device according to any one of the embodiments described above, the network device arranged between the first and second network nodes.

Accordingly, there is provided a network in which a talker is enabled to communicate with a listener despite regardless of different latency requirements. In particular, a talker can transmit data packets of a higher traffic class regardless of whether the intended recipient supports that traffic class.

In an embodiment the network comprises a network switch, wherein the network device is included in the network switch. Accordingly, the network device can be implemented by a software component in an existing network switch.

In an embodiment, the network is an automotive network. Automotive networks are usually closed networks containing a fixed number of switches. In particular, an automotive network contains less than three switches, down to only a single switch. Accordingly, in a particular embodiment of the invention, the network is a closed network containing a single network switch. Data packets transmitted by a talker device in such network need to pass one hop only (the switch). As a consequence, the actual maximum latency is only a fraction (e.g. one seventh) of the maximum latency over seven hops generally required in AVB networks. Thus, data packets can be processed by a listener in accordance with a lower traffic class while satisfying latency requirements of a relatively higher traffic class. For example, a traffic class requiring a latency of 14 ms (or less) over seven hops can be used to achieve a maximum latency of 2 ms (or less) over one hop, thereby satisfying the general latency requirement for AVB class A traffic (2 ms over seven hops). As a consequence, a data packet can be transmitted by a talker in a higher traffic class and processed by a listener in accordance with a relatively lower traffic class.

In an embodiment, the network comprises a head unit of an automotive system, wherein the network device is included in the head unit, in particular in a network switch of the head unit. Accordingly, the present invention may easily be implemented by adding a software component to the head unit in an automotive network.

In another embodiment the network further comprises three or more network nodes, wherein the network device forms the only hop or switch or bridge between the first and second network nodes. In other words, the network device may also be employed in an open network and/or a network comprising multiple hops or switches, wherein the network device is arranged between the first and second network nodes such that there are no further hops between the network device and the first and second network nodes.

According to another aspect of the present invention there is provided a method of processing data packets in a network, the method comprising: intercepting data packets of a first traffic class transmitted by a first network node and addressed to a second network node, converting the intercepted data packets into data packets of a second traffic class, and transmitting the converted data packets to the second network node.

In an embodiment, the method is implemented in an Audio Video Bridging (AVB) network, wherein the first and second traffic classes are Stream Reservation (SR) classes, and the second traffic class is lower than the first traffic class, and in particular wherein the first network class is AVB class A and the second network class is a relatively lower AVB class.

In another embodiment, the network is a TSN. However, the method may also be applied to other Ethernet or wireless networks comprising nodes of different traffic classes.

In accordance with another aspect of the present invention, there is provided a computer-program product having a non-transitory computer readable medium storing computer executable code which, when executed by computer, causes the above method to be performed. Accordingly, the method may be software-implemented, for example in a network switch of an automotive network.

BRIEF DESCRIPTION OF THE DRAWINGS

The present invention may be better understood from reading the following description of non-limiting embodiments, with reference to the attached drawings, wherein.

DETAILED DESCRIPTION OF EXEMPLARY EMBODIMENTS

An AVB network may include talker and listener devices constituting nodes of the network. The talker device may transmit traffic class A audio/video packets intended for the listener device. A network device intercepts the data packets, converts them into data packets of a lower traffic class, and forwards them to the listener.

Figure 1:
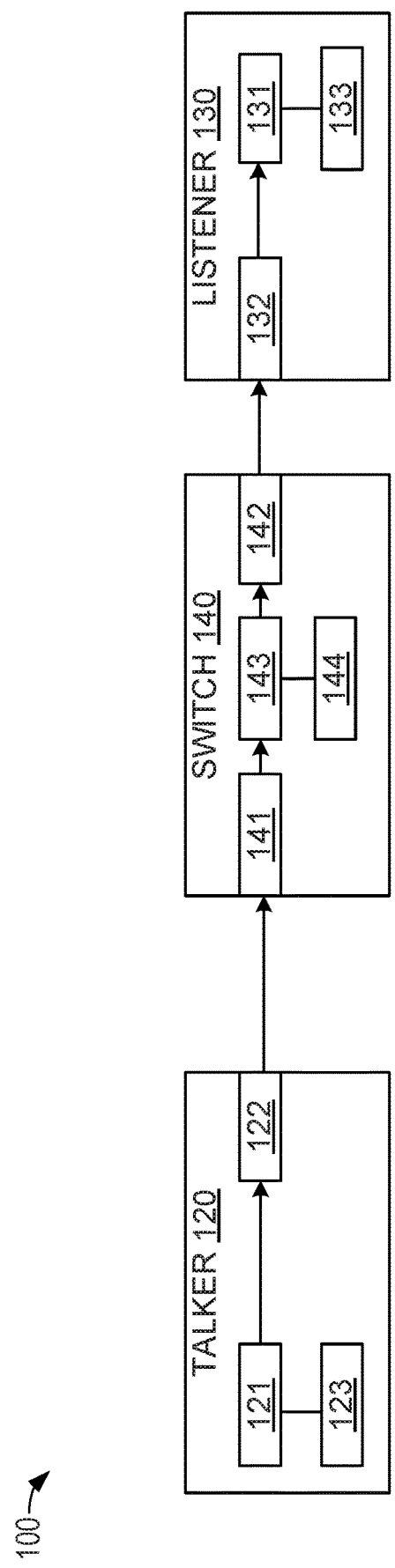
FIG. 1 schematically shows an example network in accordance with an embodiment of the present invention.

FIG. 1 shows an AVB network 100 in accordance with an embodiment of the invention. The network 100 includes a talker device 120 and a listener device 130. The listener device 130 forms an end node of the network 100. A network device 140 which may be implemented as a switch is arranged between the talker device 120 and the listener device 130.

The talker device 120 may be any suitable device for sending an audio/video stream to the listener device 130 and the listener device 130 may be any suitable device for receiving and playing back the audio/video stream. For example, talker device 120 may be implemented by an in-vehicle computing system, e.g., an infotainment system, and the listener device 130 may be linked to or implemented as part of a speaker device.

The talker device 120 includes a transmission buffer 121 configured to store the data packets of an audio/video stream, a communication interface 122 to transmit the data packets in the AVB network 100, and a controller 123 to control the transmission of data packets from the buffer 121 via the communication interface 122.

The listener device 130 includes a reception buffer 131 configured to store data packets received through a communication interface 132, and a processor 133 to process the data packets stored in the buffer 131. For example, the processor 133 may be configured to effect a conversion of the information contained in the data packets into an output audio signal.

The network device 140 comprises first and second communication interfaces 141 and 142 to receive data packets from the talker device 120 and to transmit data packets to the listener device 130, respectively. Also, the network device 140 comprises a buffer 143 to store data packets received from the talker device 120 and data packets awaiting transmission to the listener device 130. In addition, the network device 140 comprises a processing device 144 configured to process data packets stored in the buffer 143, thereby to change the traffic class of selected ones or all of the data packets in the data buffer 143. For example, the data packets may each comprise a header including a field whose bits define a traffic class. The processing device 144 may be configured to change the bits of that field thereby to change the traffic class from a first class to a second class. The second class may be a "lower" class, i.e. a class defining a higher maximum latency. For example, the first class may be AVB class A, and the second class may be AVB class B or AVB class 64×48 k or 64×44.1 k. As a result, the data packets stored in the buffer 143 are converted from data packets of a first traffic class into data packets of a second traffic class. Further, the processing device 144 is configured to effect an onward transmission of the converted data packets to the listener device 130.

In operation of the AVB network 1 illustrated in FIG. 1, the talker device 2 schedules a data packet for transmission to the listener device 130 and transmits it via the communication interface 122. The data packet may contain audio and/or video information, and the relevant field in data packet header may be set so as to define AVB traffic class A for that data packet. The data packet is intercepted by the network device 140 and converted into a data packet of a different, lower class. In particular, the network device 140 changes the bits in the relevant field of the intercepted data packet so as to define AVB traffic class B or 64×48 k or 64×44.1 k. The converted data packet is then forwarded to the listener device 130 which processes the received data packet in accordance with the traffic class defined in the packet header.

The communication between the various devices of the AVB network 100 may be implemented in accordance with Ethernet AVB protocols. In particular, the communication may be implemented in accordance with IEEE 802.1Qat-2010 for the stream reservation protocol (SRP).

Figure 2:
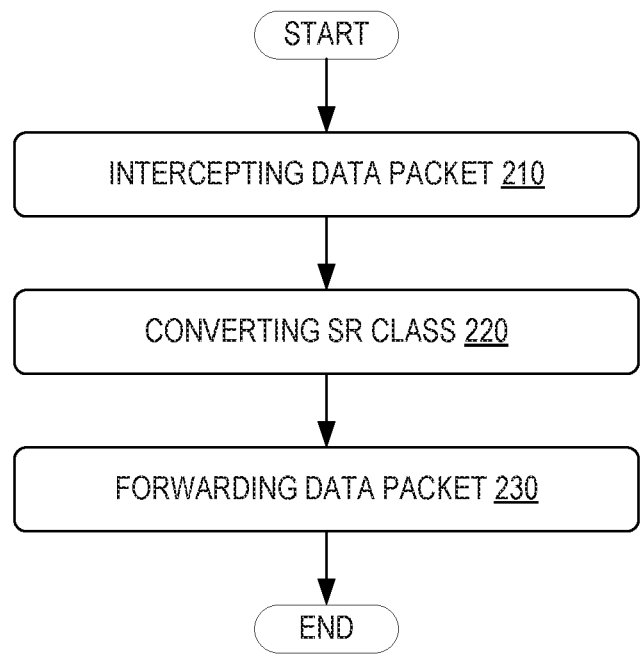
FIG. 2 is a flow chart for an example method in accordance with an embodiment of the present invention.

FIG. 2 is a flowchart illustrating a method 200 in accordance with an embodiment of the present invention. The method may be performed by a network device arranged in an AVB network between a talker and a listener, such as the network device 140 described in connection with FIG. 1.

At 210 the method includes receiving a data packet from a talker device in an AVB network. The data packet is intended for a listener device in the AVB network and has an AVB traffic class A. At 220 the method includes converting the data packet received at 210 into a data packet having an AVB class B or 64×48 k or 64×44.1 k. This is done by changing the control bits in the header of the data packet setting the traffic class. At 230 the method includes transmitting the converted data packet to the listener device for which the data packet was intended. The listener device can then process the received data packet as an AVB class B or 64×48 k or 64×44.1 k data packet.

The description of embodiments has been presented for purposes of illustration and description. Suitable modifications and variations to the embodiments may be performed in light of the above without departing from the scope of protection as determined by the claims.

In particular, whilst some of the above examples are described in connection with AVB networks, the present invention can also be implemented in TSN networks or other networks having pre-defined different traffic classes, in particular automotive networks. In such networks, the present invention achieves interoperability between nodes or devices requiring or implemented for different traffic classes.

The invention claimed is:

1. A network device for processing data packets transmitted between nodes of a network, the network device comprising:
    a processor; and
    a non-transitory computer readable medium storing executable code that is executable by the processor to:
        intercept data packets of a first traffic class transmitted by a first network node and addressed to a second network node, wherein a relevant field in a header of the data packets is set to define the first traffic class,
        convert the intercepted data packets into data packets of a second traffic class, wherein the second traffic class has lower processing load requirements of the second network node than the first traffic class,
        change bits in the relevant field of the intercepted data packets to define the second traffic class, and
        transmit the converted data packets to the second network node, wherein the second network node only supports data packets that are of the second traffic class, and wherein the second traffic class is lower than the first traffic class,
        wherein the network is a closed network with a fixed number of network switches.

2. The network device of claim 1, wherein the network is an Audio Video Bridging (AVB) network, wherein the first and second traffic classes are Stream Reservation (SR) classes, and wherein the first traffic class is AVB class A and the second traffic class is a relatively lower AVB traffic class than the first traffic class.

3. The network device of claim 1, wherein the network is a Time Sensitive Networking (TSN) network.

4. The network device of claim 1, wherein the network device is a bridge device.

5. A network for streaming audio and/or video data, the network comprising:
    a first Audio-Video Bridging (AVB) network node for generating and transmitting data packets of a first AVB traffic class;
    a second AVB network node configured to only support data packets of a second AVB traffic class, wherein the second AVB traffic class has lower processing load requirements of the second AVB network node than the first traffic class; and
    a network device arranged between the first and second AVB network nodes, the network device configured to:
        intercept data packets of the first AVB traffic class transmitted by the first AVB network node and addressed to the second AVB network node, wherein a relevant field in a header of the data packets is set to define the first AVB traffic class,
        convert the intercepted data packets into data packets of the second AVB traffic class by changing bits in the relevant field of the intercepted data packets to define the second AVB traffic class, and
        transmit the converted data packets to the second AVB network node.

6. The network of claim 5, further comprising a network switch, wherein the network device is included in the network switch.

7. The network of claim 5, wherein the network is an automotive network.

8. The network of claim 7, further comprising a head unit of an automotive system, wherein the network device is included in the head unit.

9. The network of claim 5, wherein the second AVB traffic class has lower processing load requirements of the second AVB network node than the first traffic class.

10. The network of claim 5, wherein the network is a closed network containing a fixed number of network switches, the closed network containing less than three network switches.

11. The network of claim 10, wherein the network contains only a single network switch.

12. The network of claim 5, further comprising three or more AVB network nodes, wherein the network device forms the only hop or switch or bridge between the first and second AVB network nodes.

13. A method of processing data packets in a network, the method comprising:
    intercepting data packets of a first Audio-Video Bridging (AVB) traffic class transmitted by a first AVB network node and addressed to a second AVB network node, the data packets including a header having a relevant field that is set to define the first AVB traffic class;
    converting the intercepted data packets into data packets of a second AVB traffic class by changing bits in the relevant field of the intercepted data packets to define the second AVB traffic class, the second AVB traffic class having lower processing load requirements of the second AVB network node than the first AVB traffic class; and
    transmitting the converted data packets to the second AVB network node, wherein the network is a closed network containing less than three network switches.

14. The method of claim 13, wherein the network is an AVB network, wherein the first and second AVB traffic classes are Stream Reservation (SR) classes, and wherein the first AVB network class is AVB class A.

15. The method of claim 13, wherein the network is a Time Sensitive Networking (TSN) network.

16. The method of claim 13, further comprising storing the intercepted data packets in a buffer, wherein converting the intercepted data packets into data packets of the second AVB traffic class comprises changing bits in the relevant field of selected ones of the data packets stored in the buffer.

17. The method of claim 13, further comprising storing the intercepted data packets in a buffer, wherein converting the intercepted data packets into data packets of the second AVB traffic class comprises changing bits in the relevant field of all of the data packets stored in the buffer.

18. The method of claim 13, wherein the intercepted data packets are transmitted from the first AVB network node in accordance with Ethernet AVB protocols.

* * * * *